W. E. ALLINGTON.
PRESSURE SYSTEM CHARGER.
APPLICATION FILED AUG. 14, 1914.

1,207,832.

Patented Dec. 12, 1916.
5 SHEETS—SHEET 1.

Witnesses:
Robert F. Weir
Arthur W. Carlson

Inventor
Wm. E. Allington.
Goree Bam Mays
Attys.

W. E. ALLINGTON.
PRESSURE SYSTEM CHARGER.
APPLICATION FILED AUG. 14, 1914.

1,207,832.

Patented Dec. 12, 1916.
5 SHEETS—SHEET 4.

UNITED STATES PATENT OFFICE.

WILLIAM E. ALLINGTON, OF SAGINAW, MICHIGAN.

PRESSURE-SYSTEM CHARGER.

1,207,832. Specification of Letters Patent. Patented Dec. 12, 1916.

Application filed August 14, 1914. Serial No. 856,817.

*To all whom it may concern:*

Be it known that I, WILLIAM E. ALLINGTON, a citizen of the United States, residing at Saginaw, in the county of Saginaw and State of Michigan, have invented certain new and useful Improvements in Pressure-System Chargers, of which the following is a specification.

My invention relates to a charger for trapping air-conveyable material from a source of material supply into the discharge pipe of a pneumatic "dust-conveying" system, substantially without permitting escape of air from said system.

Particularly, in many of its features, my invention relates to a charger adapted so to handle substantially dry, heterogeneous or conglomerate materials, such as the refuse from wood working mills, its purpose being to introduce the material into a long blow pneumatic conveyer system, wherein the discharge pipe is small in diameter, and wherein the air is supplied by a variable-pressure constant-volume blower developing, on occasion, relatively high pressure. Generically, such a charger as that with which my present invention has to do consists of a pocketed drum or trap, rotatable between opposed heads that have ports connected with a source of material supply, and suitable blow-piping, so that material may be delivered through a head-port, under atmospheric pressure, into a compartment of the drum at one point in its rotation between the heads, and may be blown out of the said compartment when the latter has moved forward, rotatively, to register with the discharge blow-pipe or pressure-pipe sections that open in alinement through the opposed charger heads.

Many difficulties are presented in the construction of a charger apparatus of this general type, and the general object of my invention is to provide a practical and efficient charger structure of said type; one that is simple, durable, not liable to get out of order, and especially adapted for the handling of such conglomerate materials as wood-working-mill refuse.

Some of the difficulties inherent in the provision of a mechanism of this kind arise, among other things, from the fact that the material to be handled,—consisting, in the case of wood mill refuse, of particles and bodies of all shapes and sizes from almost-impalpable dust or powder to long shavings, splinters, and wood blocks,—and further from the fact that, necessarily, different portions of the charger drum are subjected to different pressure conditions. In consequence of the nature of material and the inherently varying pressure conditions, it is very advantageous in a charger of the character described to make special provision to prevent packing of the material in dense form in the charger pockets; to prevent escape of powdery, impalpable particles into the bearing or rubbing surfaces of the drum or rotor, thereby to prevent clogging or stoppage of the drum; to provide against undue wear and other drawbacks due to unbalanced pressure conditions; and to effect proper lubrication unhindered by the escape of dust particles between the lubricated surfaces.

Further objects of my invention, therefore, are to provide structural features to meet and overcome the difficulties heretofore referred to, by protecting from dust the wearing surfaces that are most apt to be dust-clogged and by effecting their proper lubrication; by providing for a pressure distribution within the compartments of the rotor substantially to minimize unbalanced wear and obviate dust-leakage, and yet to permit the use of a minimum number of compartments or pockets; by providing for loosening the material in the pockets after they have been filled and before they are brought into register with the blower connections; and further by providing means for relieving the pressure of air entrapped within the compartments after they have emptied and have passed from register with the blower connections and before they again register with the material supply port.

Other and further objects of my invention will become apparent to those skilled in the art from a consideration of the following specification taken in connection with the accompanying drawing illustrating, for purposes of full disclosure, a single practical embodiment of my invention, and wherein:

Fig. 2ᵃ is a sectional detail view showing the wear plate at the edge of the radial partitions.

Referring to the drawings, 20 indicates in general a frame structure which, it will be understood, may be varied in specific construction, according to the requirements of the particular installation. The typical structure here shown comprises a base 21 formed of channel bars, corner posts 22, preferably of angle iron, and an upper horizontal top structure 23 that affords support to the lower head of the charger. The charger comprises in general a rotatable pocketed drum, 24, preferably cylindrical in form, and divided by radial walls into a plurality of sector-shaped compartments, said drum being carried for rotation by a vertical shaft 25 between the two relatively stationary heads 26 and 27, the latter being secured fixedly to, foundationed on, and leveled in, the frame member 23.

I prefer that the shaft 25 which carries the charger-rotor shall find bearing only in the supporting structure below the charger; that the drum shall be driven in rotation by power applied close to the single-end shaft-bearing thus afforded; and that the upper charger-head 26, bearing on the charger-drum shall be free for some adaptive movement to adjust itself to the drum surfaces that support it. Each of these features makes for reduction of the power required to operate the drum and for maintenance, under all conditions, of the proper corelation between the rotating and non-rotating elements of the charger structure to prevent uneven wear and reduce liability to air leakage.

In the specific construction shown, the rotatable shaft 25 receives its single bearing at 27′ in a central hub on the fixed bottom head 27 and the drum 24, splined on said shaft, receives the power to rotate it in substantially its bottom plane, a sprocket 28 close to the bottom of the drum (integral with or fast upon the bottom spider of said drum, hereafter described) receiving a chain 29 driven by a small sprocket 30 carried on the upper end of a shaft 31 that is suitably journaled as at 32—32 and is driven by beveled gearing 33 from the horizontal power shaft 34 that receives its power from the belt pulley 35. The drum, thus mounted on the short shaft, bears by gravity on the upper surface of head 27, and the upper head 26, loose on the shaft 25, and centered by it, bears by gravity upon the upper end of the drum 24. Although the upper head 26 is thus free for adaptive self-adjustment to the coacting surface of the drum, it should be fixed against rotation, and to this end I preferably employ an anchor bolt 36 secured to the upper head 26 and taking somewhat loosely through the corner post 37 that is preferably an extension of one of the posts 22, and is braced for suitable rigidity as by braces 37′. If preferred the two heads may be connected by tension devices beyond the drum-periphery, or suitable weights placed on head 26.

I prefer that the rotor or pocketed drum 24 shall be formed with a minimum number of compartments consistent with the desired operation, and that as much of the circular area of the drum as is possible shall be included in the pocket-space,—thus to reduce to a minimum the size of the drum for given capacity. To this end I preferably divide the drum, by radial partitions 38 into five compartments or pockets, this being the smallest number that may effectively be used to secure the normal pressure-condition that I prefer to establish and maintain in the rotor-compartments. In this connection it will be understood, however, that other features of my invention are not dependent on number of pockets.

More specifically the rotor or pocketed drum 24 comprises a pair of spiders 39—39 spaced apart and rotatable with the shaft 25, each having five radial arms 40 connected at their outer ends by the annular ring 41 cast integral therewith, and at their inner ends integral with hub 41′. A cylindrical shell 42 is within the flanges 43 of the rings 41—41 and is riveted thereto as at 44. This shell 42 forms the outer wall of the material-receiving pockets, the inner wall of which is formed by a smaller concentric shell 45, fitting at its ends over the flanges 46 on the hubs 41′—41′. Each partition 38 comprises a pair of vertical, parallel side-plates 47—47 bolted together as at 48 just above and below the radial arms 40 of the lower and upper spiders, respectively, and at their vertical edges bolted together as at 48′ just inside of the flanges of the vertical, U-shaped channels 49—49 that in turn are riveted to the confronting surfaces of the shells 45 and 42 thus in effect clamping the walls of the partition together but not directly fastening them to the rotor. To give stiffness to the partition structure a suitable number of braces 50—50 may be interposed between the side plates 47—47, and the hollow partition, thus fabricated, is filled with cement 51. This construction is one advantageous arrangement for insuring suitable rigidity to the partition walls, so that the side plates 47—47 thereof may not buckle or bulge, or work loose under the pressure variations that necessarily exists at times on opposite sides of a partition.

It is important, of course, that all end surfaces of the rotors shall make true contact with the opposing surfaces of the heads 26 and 27 and so on the upper and lower leading edges of the partitions I provide vertically adjustable contact-strips or wear plates 54, and the top and bottom spiders of the rotor, as well as the surfaces of the heads coacting with the rotor, are smoothly machined. The wear plates 54 are thin, and make, at most, only a slight contact with the opposing head surfaces, thereby dispensing with all need for lubrication of such surfaces. I regard this as important, for it will be obvious that if the construction of the charger-rotor is such as to require the whole plate-surfaces to be lubricated the always-serious, difficult matter of lubrication becomes greatly exaggerated, for, on the bottom plate especially, the bodies of dry "dust" in transit will wipe off or absorb the lubricating oil very rapidly.

For rigidity to preserve their surface planes, the top and bottom heads 26 and 27 are externally ribbed, the ribbing of course being located so as not to interfere materially with the position of the ports. From the center of the bearing hub from head 26 to parallel ribs 58—58 extend diametrically to a border flange 57 that conforms to the plan contour of the place, which is peferably polygonal, these ribs running substantially at right angles to the radius bisecting the material supply port and, therefore, roughly speaking, on the diameter on which pressure-changes take place. Other strengthening ribs 59 and 59' extend nearly radially to the rim 57 from points of intersection with the first mentioned ribs 58. The rib 59 stands at right angles to the rib 58 and the ribs 59'—59' preferably coincide with the side edges of the material supply port. This ribbing may be duplicated on the lower plate.

The upper head has a material supply port 60, between the ribs 59' 59', and at a suitable distance in advance thereof, (in the direction of rotation) a pressure-supply port 61, each of these ports being connected to a suitable adapter, 60' or 61', the former connected to any source of material supply and the latter connected by suitable blow piping with the source of air pressure supply. Just in rear of the material supply port 60, with reference to the direction of rotor movement, there is, (preferably in head 26) a relief port 62 opening to the atmosphere. The lower head 27 has preferably only a single port 63, alining with the pressure supply port 61 and connected by a suitable adapter 63' with the long-blow-discharge piping through which the material trapped in the charger is to be delivered to its ultimate point of deposit. This port 63 is preferably so located that it opens to an advancing compartment before the port 61 opens to said compartment so that each advancing compartment receives pressure from the bottom, causing a "kick-back" or bottom introduction of air under pressure that serves to loosen up the material in the compartment and prepare it for delivery when the compartment immediately thereafter comes into register with the pressure supply port.

Figure 8:
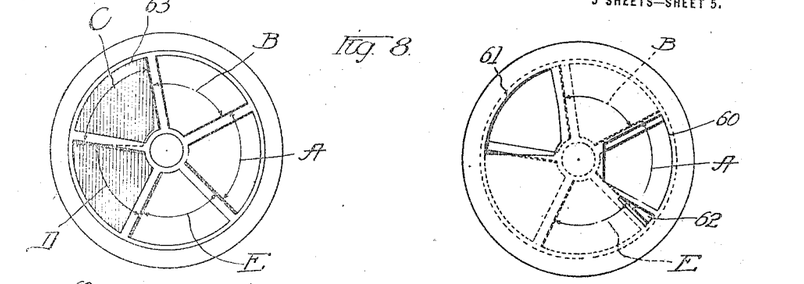
Figs. 8, 9, 10 and 11 are diagrammatic views indicating the rotor in various positions that it takes during one complete cycle or revolution, the relation of the rotor to the top plate ports being shown to the right; its corresponding relations to the bottom plate port being shown to the left; and the areas under more-than-atmospheric pressure being indicated by shade lines.
Figure 9:
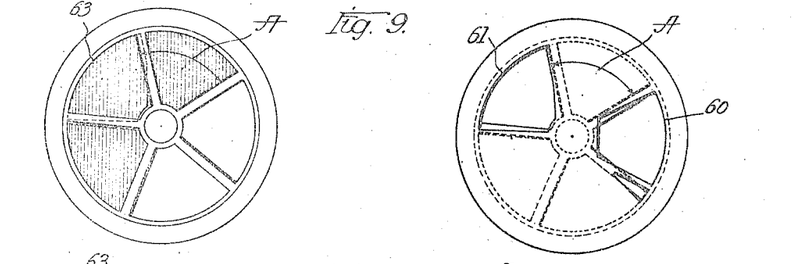
Figure 10:
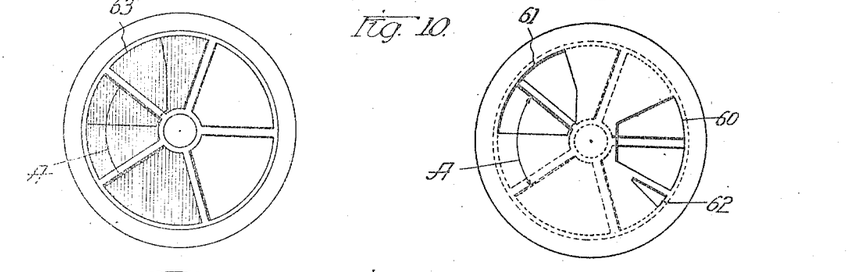
Figure 11:
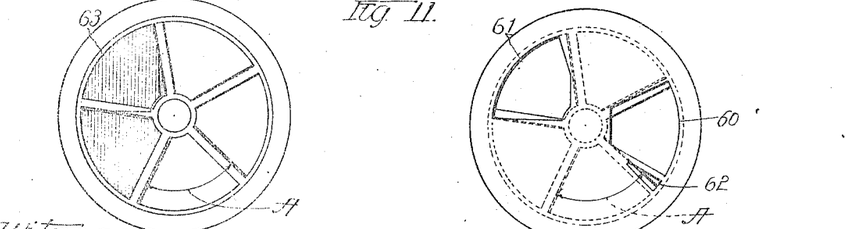

Referring to Figs. 8 to 11 (wherein the views on the right show the relation of a rotor to the material feed and air feed ports 60 and 61, and the views on the left show similar relation of the rotor to material-and-air discharge port 63) it will be observed that when a compartment A directly spans the port 60, (being therefore under atmospheric pressure) the compartment B preceding in the direction of rotation will not yet have opened to the ports 61 and 63, so that said compartment B will still be under atmospheric pressure, and also the fifth compartment E, registering with the relief port 62 will be under atmospheric pressure. Momentarily, therefore, while this relation exists, only the compartment C (which is in register with the pressure piping) and compartment D (which has not yet reached the relief port 62) will be under blower-pressure. As the rotor advances very slightly, however, compartment B will be put under discharge-pipe pressure, this change occurring as soon as the edge-plate of the forward partition wall of compartment B passes the lip of port 63, and from that time on for nearly a fifth of a revolution of the rotor, (that is to say, until the compartment D opens to the relief port 62) three of the five compartments will be maintained under dischargepipe pressure. Since this pressure area is more than half the area of the drum, the uplift on the upper head 26 caused by the air pressure is not confined wholly to a sector at one side of the structure and so the tendency toward uneven wear due to unbalanced pressure is lessened. The several successive positions of the compartment A are shown in the diagrammatic drawings. In Fig. 8 it is receiving its material charge. In Fig. 9 the compartment is just receiving its first "back-kick" of air under pressure, its bottom edge having opened to port 63. In Fig. 10 it is in position passing complete exhaust, in Fig. 11, it is in register with the relief port 62 and so is being restored to atmospheric pressure.

It will be apparent to those skilled in the art that the two allied problems of lubricating the wearing surfaces of the charger and preventing the fine dust from getting into the oiled wearing surfaces are serious factors in a machine of the character described. Some of the dust handled in such a charger is so powdery and impalpable that it is practically impossible to retain it by any joint that can be made between moving parts, and yet its escape into the oiled bearing surfaces inevitably results in clogging of the machine in course of time to an extent that is wasteful of power, preventative of proper lubrication, therefore, occasioning serious wear. Also this dust will wedge in and build up a layer between the surfaces which allows of serious leakage and final clogging of the system.

Figure 1:
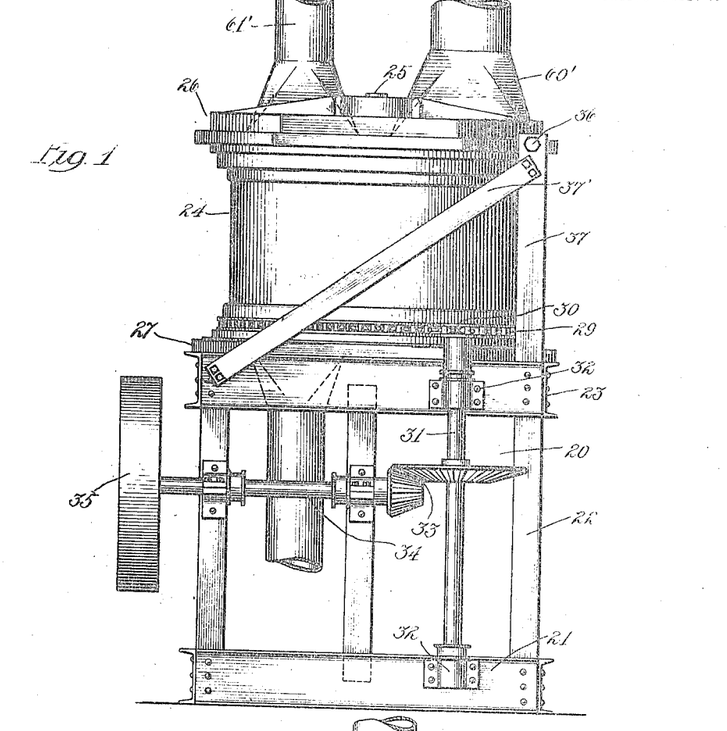
Figure 1 is a side elevation of my improved charger.
Figures 2, 3:
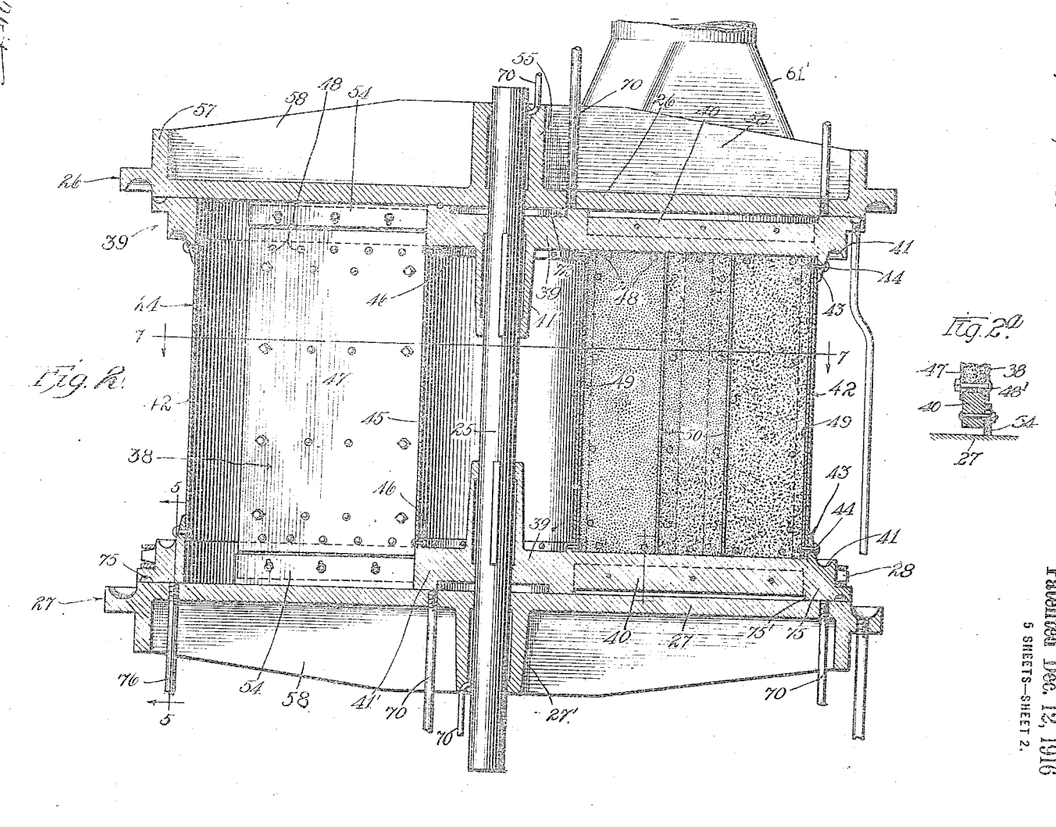
Fig. 2 is a diametric vertical sectional view of the same.
Fig. 3 is a plan view of the charger head.
Figure 3:
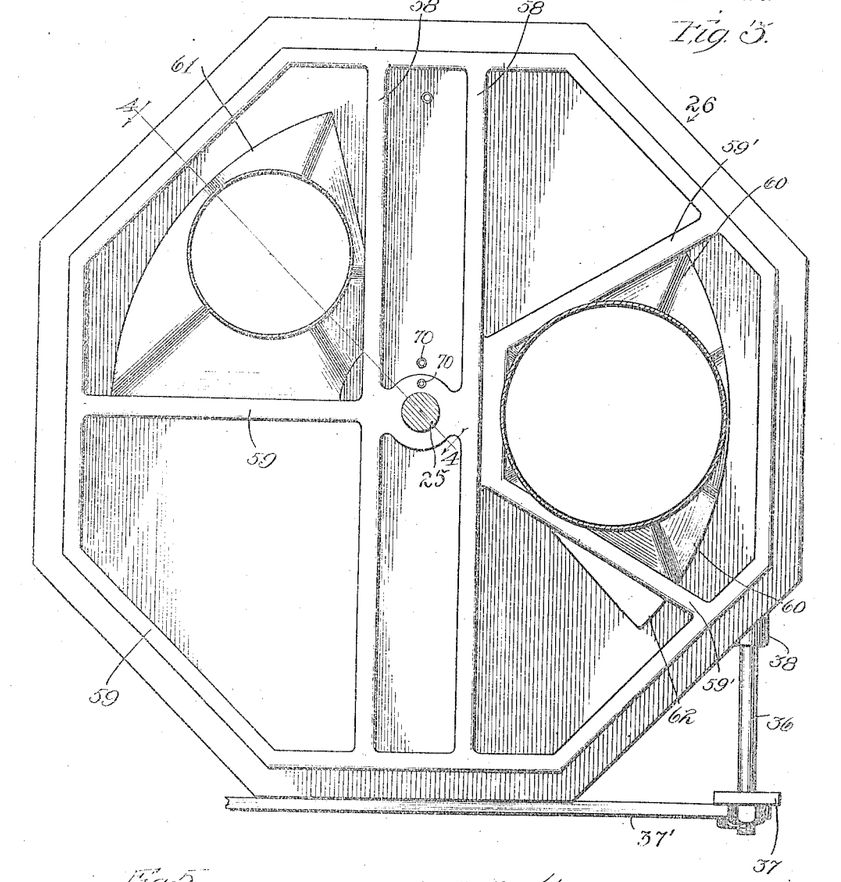
Figure 4:
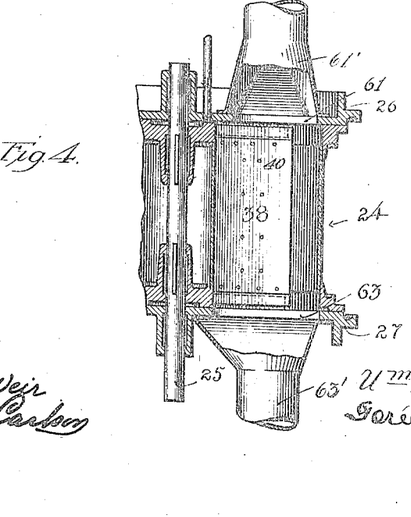
Fig. 4 is a fragmentary, vertical, sectional view on the line 4—4 of Fig. 3.
Figure 5:
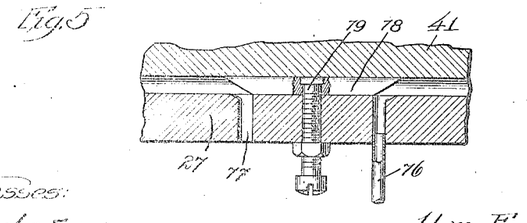
Fig. 5 is a fragmentary, sectional view on line 5—5 of Fig. 2.
Figure 6:
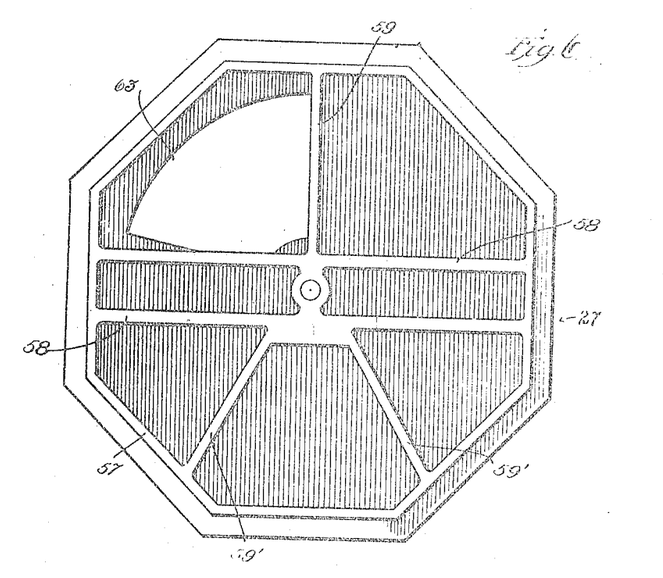
Fig. 6 is a view of the under surface of the lower head, detached.
Figure 7:
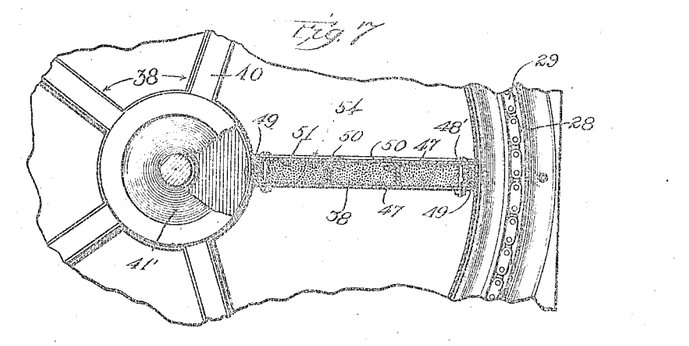
Fig. 7 is a fragmentary, horizontal sectional view on line 7—7 of Fig. 2.

The bearing surfaces of the hub and rim are all oiled, preferably by pressure oiling system delivering oil through suitable piping, generally indicated at 70. It is of course generally true that with the horizontal rotating surfaces the oil will tend to work outwardly toward the periphery of the rotor, carrying with it any dust that may tend to accumulate in the bearing surfaces, so that as to the bearing surfaces of the hub no particular protection against dust accumulation is necessary. Also I find in practice that the rim bearing at the top of the rotor needs substantially no protection, as the fine dust tends to settle at the bottom of the rotor and accumulation on the top bearing surface is not serious. At the bottom-rim bearing-surface, however, the tendency of the fine dust is to grind and work out into the bearing, and it is at this point in my device that serious clogging is apt to take place unless special provision is made to overcome it. For this reason I make the lubricated surface of the bottom rim materially less in width than the full rim width, and between the lubricated surface and the inner face of the rim 41 I provide in the rim a channel 75, extending circumferentially and uninterruptedly. This channel I use for the passage of air from an inlet duct 76 at any suitable peripheral point to an outlet duct 77 closely adjacent thereto. Between the inlet and outlet ducts I mount on the fixed head 27 an interrupter block or stop 78 fastened to the plate 27 as by screws 79, Fig. 5. This interrupter 78 is, of course, shaped in cross section exactly to correspond with the groove 75 to interfit neatly therein, and its ends adjoining the air inlet and outlet ducts 76 and 77 are preferably beveled (practically near the outlet 77) so that no eddy space in the air passage is formed. Air under pressure forced into the inlet 76 preferably travels, at high velocity, in the same direction in which the rotor turns, and while the unlubricated edge 75' between the groove 75 and the inner surface of the rim may wear, owing to lack of lubrication, so that fine dust escapes into the groove 75, such dust will never get into the lubricated bearing surface beyond the groove, for the dust particles are swept around in the channel and delivered through the air outlet 77. The beveling of the end of separating wall 78 enables slivers, chips and the like that may escape into the channel to be delivered into the air outlet pipe without clogging the latter.

While I have herein described in some detail a particular embodiment of my invention, it will become apparent to persons skilled in the art that changes may be made in the structure without departure from the spirit of my invention and within the scope of the appended claims.

What I claim is:

1. In a charger of the character described, the combination of a rotatable pocketed drum, heads therefor, a material supply connection opening through the one head, air pressure supply and delivery connections opening through opposite heads, the last said connections arranged with respect to the drum that a compartment, moving in rotation, opens to the delivery connections before opening to the pressure supply connections.

2. In a charger of the character described, the combination of opposing heads, a drum therebetween having walls dividing the drum into five compartments, one said head provided with material supply and air pressure supply ports, the other head having a delivery port substantially alining with the pressure supply port, and one of said heads having a vent-port, said pressure and delivery ports located slightly more than a compartment space in advance of the material supply port, and one of said air ports arranged to open to an approaching compartment at substantially the same time that the vent-port opens to a compartment third in advance thereof, whereby three of the five compartments may normally be maintained under pressure.

3. In a charger of the character described, the combination of opposing heads, a rotatable drum therebetween having partition walls dividing it into five compartments, there being in one head a material supply port, an air pressure supply port in advance thereof slightly more than the space of a compartment, and a vent port slightly in rear of the material supply port, and in the opposite head a delivery port generally in alinement with the pressure supply port and arranged to open to a progressing pocket, before said pressure supply port opens thereto, and at approximately the same time in the rotation of the drum that the vent port opens to the compartment third in advance.

4. In a charger of the character described, the combination of opposing heads, a drum with its axis vertical therebetween and having walls dividing the drum into five compartments, one said head provided with material supply and air pressure supply ports, the other head having a delivery port substantially alining with the pressure supply port, and one of said heads having a vent-port, said pressure and delivery ports located slightly more than a compartment space in advance of the material supply port, and one of said air ports arranged to open to an approaching compartment at substantially the same time that the vent-port opens to a compartment third in advance thereof, whereby three of the five compartments may normally be maintained under pressure, a shaft for said drum and to which it is secured, a single shaft bearing in the lower head, and means to rotate said drum and acting directly on the drum adjacent its lower end.

5. In a charger of the character described, the combination of a drum, positioned with its axis vertical, a short shaft therefor rotatable therewith, relatively stationary heads for the drum providing a material supply port in one head and alining air ports in the other head, a single shaft-bearing close to the lower head, and means for rotating said drum arranged to apply power in plane close to the shaft supporting bearing.

6. In a charger, the combination of a pocketed drum having a rigid bottom frame member, said drum being positioned with its axis vertical, heads for said drum, having appropriate air and material openings, the bottom head providing the single bearing for the shaft, and means to rotate said drum acting on said rigid bottom frame in a plane close to the single shaft bearing.

7. A charger of the character described, comprising an open ended drum having radial partition walls therein dividing the drum into a plurality of pockets, a vertically disposed shaft for said drum, a bottom head affording a single bearing for said shaft, and a floating head overlying the upper end of said drum, said heads having material feeding and air supply and discharge openings therein.

8. A charger of the character described, comprising an open ended drum having radial partition walls therein dividing the drum into a plurality of pockets, a vertically disposed shaft for said drum, a bottom head affording a single bearing for said shaft, a floating head overlying the upper end of said drum, said heads having material feeding and air supply and discharge openings therein, and means for holding said floating head against rotation.

9. In a charger of the character described, the combination of a supporting frame, a bottom cover plate fixed thereon affording a central shaft bearing, a shaft rotatable in said bearing, a drum rotatively fixed on said shaft providing a plurality of pockets, an upper head loose on said shaft and bearing on said drum, material feeding and air supply and discharge openings in said plate and head and means for holding said upper head against rotation.

10. In a charger of the character described, the combination of a drum, comprising lower and upper spiders, concentric shells connected to the rim and hub of said spiders and radial partition walls connected to the arms of said spiders and to said shell, and heads having materials feeding and air supply and discharge openings for said drum.

11. In a charger of the character described, the combination of a drum, comprising lower and upper spiders, concentric shells connected to the rim and hub of said spiders and radial partition walls, each said wall comprising two plates on opposite sides of the alining spider arms and a cement filling between said plates and upper and lower drum closing heads having materials feeding and air supply and discharge openings therein.

12. In a charger of the character described, the combination of a drum, comprising lower and upper spiders, concentric shells connected to the rim and hub of said spiders and radial partition walls connected to the arms of said spiders and to said shell heads having material feeding and air supply and discharge openings for said drum, and adjustable contact blades on the upper and lower edges of said wall.

13. In a charger of the character described, the combination of a pocketed drum, upper and lower heads, having material feeding and air supply and discharge openings, and against which said drum bears throughout its periphery, the coacting surfaces of the plate and drum providing a channel between said peripheral bearing surfaces and the pocket area, and means for circulating fluid through said channel.

14. In a charger of the character described, providing a rotatable drum, coacting top and bottom heads, separated air supply and outlet material feeding pipes leading to the said heads, and a channel in the outer rim of the drum interposed between the bearing surface thereof and the material pockets, through which the air may pass to guard the bearing surface radially beyond the channel against escape of dust.

15. In a charger of the character described, opposing heads having material feeding and air supply and discharge openings, a rotor therebetween having rims bearing on the heads, and having division walls dividing it into compartments, means to lubricate the bearing of the rims and heads, and thin wear plates on the division walls in non-lubricated coaction with the heads.

In testimony whereof I hereunto set my hand in the presence of two subscribing witnesses.

WILLIAM E. ALLINGTON.

In the presence of—
FORÉE BAIN,
STANLEY W. COOK.